(12) United States Patent
Cartmell (10) Patent No.: US 7,684,790 B2
(45) Date of Patent: Mar. 23, 2010

(54) ADVERTISING TECHNIQUE

(76) Inventor: Brian R. Cartmell, 701 5th Ave., No. 5800, Seattle, WA (US) 98104

( * ) Notice: Subject to any disclaimer, the term of this patent is extended or adjusted under 35 U.S.C. 154(b) by 751 days.

(21) Appl. No.: 11/423,042

(22) Filed: Jun. 8, 2006

(65) Prior Publication Data

US 2007/0287437 A1  Dec. 13, 2007

(51) Int. Cl.
*H04M 11/10* (2006.01)
(52) U.S. Cl. .............. 455/414.1; 455/456.3; 455/556.1; 705/27
(58) Field of Classification Search .............. 455/414.1, 455/456.1, 456.3, 556.1; 705/10, 27; 370/338
See application file for complete search history.

(56) References Cited

U.S. PATENT DOCUMENTS

| 2002/0013725 A1* | 1/2002 | Takakura et al. .............. 705/10 |
| 2002/0160817 A1* | 10/2002 | Salmimaa et al. ............ 455/566 |
| 2003/0050827 A1* | 3/2003 | Hennessey .................... 705/10 |
| 2003/0095524 A1* | 5/2003 | Stephens et al. ............. 370/338 |
| 2005/0071253 A1* | 3/2005 | Yang ........................... 705/27 |
| 2006/0282312 A1* | 12/2006 | Carlson et al. ................. 705/14 |

* cited by examiner

*Primary Examiner*—Danh C Le (57) ABSTRACT

An advertising technique includes communicating messages to a mobile device that are rendered on the mobile device for the purpose of advertisement. The advertisement is rendered based on the occurrence of an advertisement event, such as an inbound telephone call, the elapse of time, entering a predefined geographic area, or the like.

17 Claims, 6 Drawing Sheets

ADVERTISING TECHNIQUE

BACKGROUND

Mobile advertising, in which advertisers connect with consumers through their cellular telephones, personal digital assistants (PDA) and other mobile devices, has exploded in recent years. For example, an advertiser may encourage cellular telephone users to participate in trivia contests or enter sweepstakes, thereby opting into a marketing campaign which enables the advertiser to send those users coupons or promotional offers.

Mobile advertising is still in its infancy, however, and merchant use of mobile advertising and its many advantages has not been fully exploited. Accordingly, many more innovative and effective uses of this mode of advertising may yet be possible, particularly methods which allow advertisers to target the delivery of advertisements narrowly with respect to the time and place at which those advertisements are rendered, and the manner in which they are rendered.

SUMMARY

The present invention is directed at a method and product for advertising by communicating messages to a mobile device that are rendered on the mobile device for the purpose of advertisement.

DETAILED DESCRIPTION

In the following discussion, many specific details are provided to set forth a thorough understanding of the present invention. It will be apparent, however, to those skilled in the art that the present invention may be practiced without the explicit disclosure of some specific details, and in some instances of this discussion with reference to the drawings, known elements have not been illustrated in order to not obscure the present invention in unnecessary detail. Such details concerning computer networking, software programming, telecommunications and the like may at times not be specifically illustrated as such are not considered necessary to obtain a complete understanding of the core present invention, but are considered present nevertheless as such are considered to be within the skills of persons of ordinary skill in the art.

It is also noted that, unless indicated otherwise, all functions described herein may be implemented in hardware, firmware, software, or some combination thereof. In some embodiments the functions may be performed by a processor, such as a computer or an electronic data processor, in accordance with code, such as computer program code, software, and/or integrated circuits that are coded to perform such functions. Those skilled in the art will recognize that software, including computer-executable instructions, for implementing the functionalities of the present invention may be stored on a variety of computer-readable media including hard drives, compact disks, digital video disks, integrated memory storage devices and the like.

Furthermore, the following discussion is for illustrative purposes only, and discusses the present invention with reference to various embodiments which may perhaps be best utilized subject to the desires and subjective preferences of various users. One of ordinary skill in the art will, however, appreciate that the present invention may be utilized in a great variety of forms in the electronic delivery of advertisements of any type. Unless explicitly stated, the method embodiments described herein are not constrained to a particular order or sequence. Additionally, some of the described method embodiments or elements thereof can occur or be performed at the same point in time.

Figure 1:
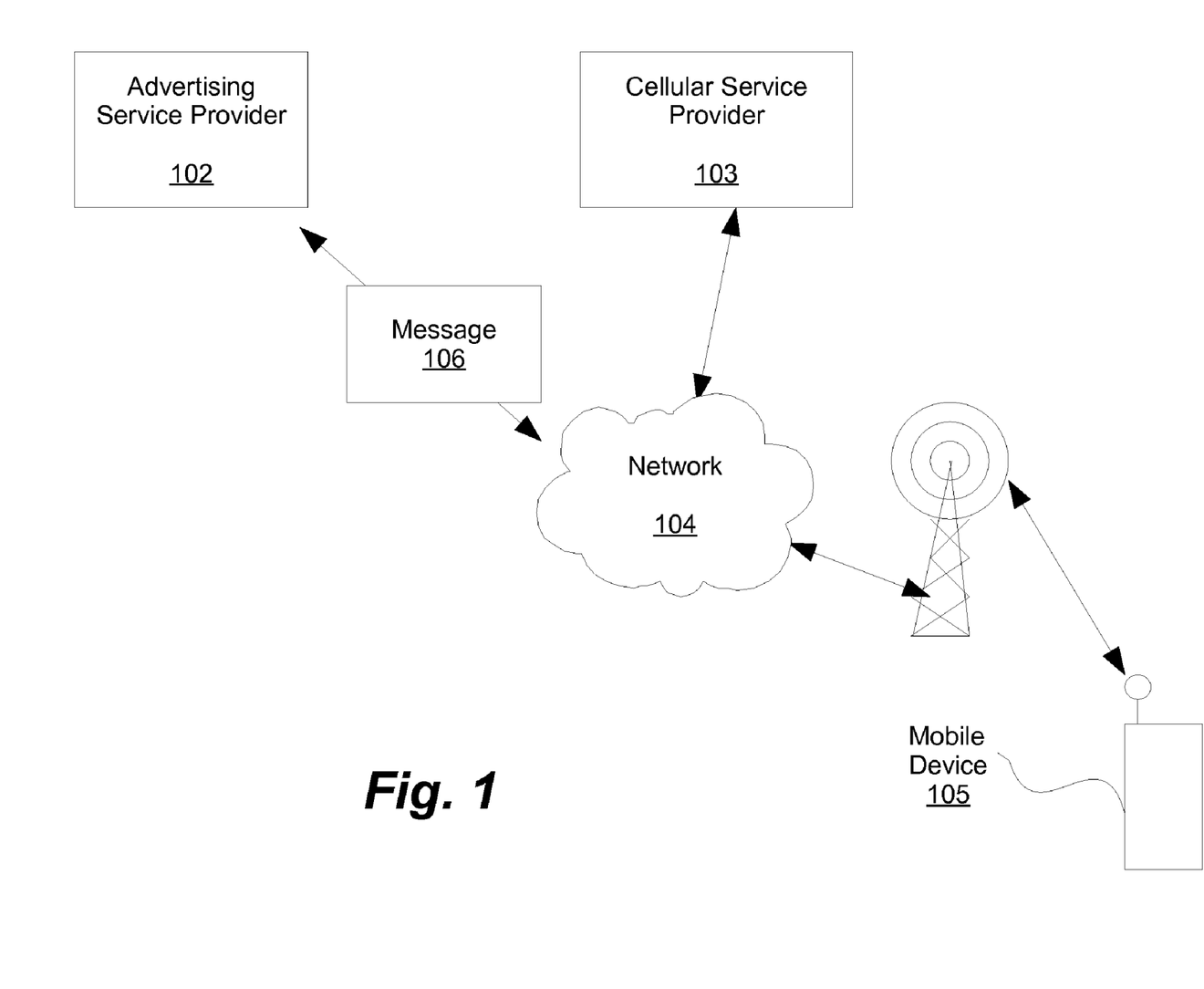
FIG. 1 illustrates by way of a block diagram one embodiment of the present invention implemented through an advertising service provider's communication of messages to a mobile device.

Referring now to FIG. 1, there is shown in the form of a block diagram one embodiment of an aspect of the present invention for the communication of messages to various of different types of mobile devices, for example, by way of a mobile phone device. Any conventional or non-conventional mobile phone device or equivalent may be adapted for use in the present embodiment, including PDAs, laptop computers, pagers, Internet appliances, or any other device capable of receiving messages, including but not limited to cell telephones from any catalog of the many mobile phone device vendors, some of which have the capability and appearance of a personal computer, or which are generally multi-functional. This embodiment is also contemplated for use with any mobile communication network, and with any method or technology which may be used to communicate with said network, including without limitation wireless fidelity networks, Universal Serial Bus (USB) cables, and the like.

Embodiments of the invention may use any message capable of being sent or received by way of a telephone device, through the Internet, or through any other electronic delivery means. Some non-limiting examples of such messages include, for illustration purposes only, an advertisement, public service announcement, or any other media content which may be sent to a mobile device. In short, the messages contemplated to be sent and/or received in accordance with embodiments of the present invention are only limited by one's imagination, and may conceivably be anything or take any form.

As shown in FIG. 1, an advertising service provider 102 may send a message 106 to a network 104 for delivery to a mobile device 105. Here, the network is a cellular phone network operated by a cellular service provider 103. It is also contemplated that the advertising service provider 102 may send the message 106 directly to the mobile device 105. The advertising service provider 102 may be any entity or person desiring to send a message to a mobile device. The message 106 maybe in one of various forms, for example, Short Message Service ("SMS") text content or Multimedia Service ("MMS") content. If the message 106 is an SMS text message or a MMS multimedia message, the message 106 may be sent to the mobile device 105 via network 104 using one or more SMS centers ("SMSC") or MMS centers ("MMSC") which provide gateway interfacing with respect to mobile device 105 and network 104. The message 106 may also be sent to mobile device 105 directly from advertising service provider 102 by way of one or more SMSCs or MMSCs. In addition to the SMS and MMS messaging protocols, and without limitation, other messaging protocols are also contemplated for use herein, such as the Enhanced Messaging Service ("EMS"), which is a type of halfway service between SMS and MMS, and which enables some features of MMS capability including text, some simple pictures and audio, graphics and animation. It is also contemplated that the present invention be used in conjunction with such SMS/EMS/MMS methods as, for example, services which allow for sending and receiving SMS/EMS/MMS messages to and from an application or a person's e-mail, and the transmission of graphics and/or picture images via messaging and the like.

Figure 2:
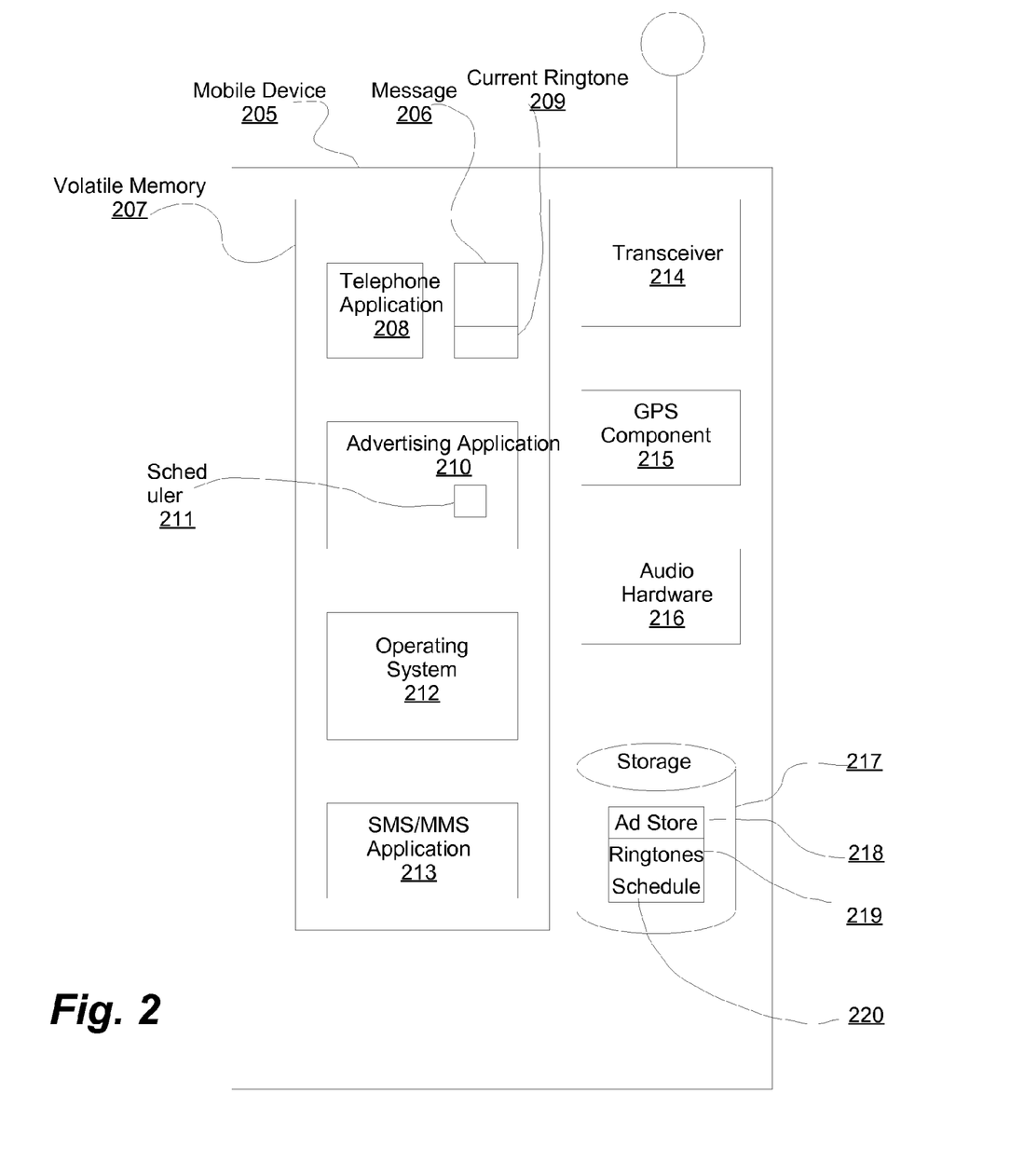
FIG. 2 illustrates by way of a block diagram an embodiment of a mobile device configured in accordance with the present invention.

As shown in FIG. 2, there is depicted in a functional block diagram an embodiment of a mobile device 205 constructed in accordance with one embodiment of the present invention. Mobile device 205 includes volatile memory 207 (for example, RAM) and persistent storage 217 and the computer-readable media (for example, disk drive, ROM, flash memory or other solid state memory technology, etc.) associated with volatile memory 207 and persistent storage 217. Computer-readable media may comprise, for example and without limitation, volatile and persistent (i.e., non-volatile) media for storage of data such as computer-readable instructions or data structures, including but not limited to DVD or other optical storage, RAM, ROM, flash memory, or any other medium which can be used to store information and can be accessed by mobile device 205.

Mobile device 205 includes a mechanism for receiving a message 206. The receiving mechanism is shown in this particular embodiment as transceiver 214 (for example, an RF radio transceiver). The mobile device 205 further includes a mechanism for storing the message 206. In the embodiment shown in FIG. 2, the mechanism for storing the message 206 is advertising application 210, which includes a scheduler 211. In the embodiment shown, advertising application 210, telephone application 208, and SMS/MMS application 213 all run atop an operating system 212.

When transceiver 214 receives the message 206, the advertising application 210 reads the message 206 and causes it to be stored in volatile memory 207. When the message 206 is received by transceiver 214, the advertising application 210 may cause the message to be relayed to other mobile devices via transceiver 214, or perhaps committed to persistent storage 217.

The message 206 includes an advertisement identifier which identifies a particular advertisement to be rendered. The message 206 may include an advertisement, which the advertising application 210 may cause to be stored in advertisement store 218 for later rendering, or may cause to be rendered immediately, depending upon the data included in message 206. The advertisement may take one of many potential forms, for example, a wav file, an mp3 file, or any other electronic data capable of being rendered in a form which is visible, audible, or otherwise communicable to a user of the mobile device 205 or to those in proximity to the mobile device 205. Alternatively, message 206 may identify an advertisement which has already been stored in advertisement store 218. Message 206 may specify that the identified advertisement is to be rendered at a particular time or location, or in response to an incoming telephone call.

The mobile device 205 also includes a mechanism for rendering the advertisement identified in message 206. In the embodiment shown in FIG. 2, the rendering mechanism is advertising application 210 operating in connection with audio hardware 216. The mobile device 205 may also include video hardware for rendering video advertisements, or any other mechanism for communicating advertisements. The illustrated embodiment further includes a Global Positioning System (GPS) component 215 for determining the position of mobile device 205. It is contemplated that GPS component 215 may be any component, for example, a Bluetooth® application, a GPS receiver, etc. which may be used in connection with a mobile device and is capable of communication with one or more GPS satellites, either directly or via one or more position determination entities (PDE) which assist the GPS component in locating broadcast signals from the GPS satellites.

The advertising application 210 reads the data in message 206, and causes the advertisement associated with message 206 to be rendered in the manner provided in that message. For example, message 206 may specify that the associated advertisement is to be rendered in response to an incoming telephone call. In that event, advertising application 210 will monitor transceiver 214 and/or telephone application 208, and upon receipt of an incoming telephone call, advertising application 210 will cause the advertisement associated with message 206 to be rendered via audio hardware 216.

In another aspect, message 206 may include scheduler data which specifies that the advertisement associated with message 206 is to be rendered in response to the mobile device 206 entering a particular geographic area. Scheduler 211 then stores the scheduler data in scheduler data store 220, and instructs advertising application 210 to monitor the data received from GPS component 215. When GPS component 215 indicates the mobile device 205 has reached the area where the advertisement associated with the message 206 is to be rendered, advertising application 210 causes that advertisement to be rendered by audio hardware 216. Advertising application 210 may receive a messages sent through a cellular telephone network. Advertising application 210 may also receive a message directly from a PDE, and then cause the advertisement associated with the message to be rendered in the manner provided in the message.

In yet another aspect, scheduler data in message 206 may specify that the advertisement associated with message 206 is to be rendered at an identified time. Scheduler 211 then stores the scheduler data in scheduler data store 220, and instructs advertising application 210 to monitor the time, as indicated by operating system 212 or any other means of determining the correct time. When operating system 212 indicates the mobile device 205 has reached the identified time, advertising application 210 causes the advertisement associated with message 206 to be rendered by audio hardware 216.

The message 206 may include a ringtone 209. Depending upon the data included in message 206, the advertising application 210 may cause the ringtone 209 to be stored in ringtone store 219 for later rendering. Alternatively, message 206 may instruct advertising application 210 to identify the ringtone 209 included in the message as a current ringtone.

Message 206 may include a ringtone identifier which specifies a particular ringtone for rendering in connection with the advertisement identified in message 206. If so, the advertising application 210 causes the ringtone 209 to be rendered in connection with the identified advertisement. Alternatively, the ringtone identifier in message 206 may instruct advertising application 210 to retrieve a particular ringtone from ringtone store 219 and cause that ringtone to be stored in volatile memory 207 as the current ringtone for rendering in connection with the identified advertisement.

The advertising application 210 may provide a mechanism for controlling the volume at which the advertisement identified in message 206 is rendered. For example, advertising application 210 may provide the user with a scroll bar, series of radio buttons, or other method of selecting the decibel level at which advertisements are to be rendered. Alternatively, the advertising application 210 may read display characteristics included in message 206, which provide that the advertisement associated with message 206 is to be rendered at a particular volume level. This feature allows the advertising service provider to cause a particular advertisement to be rendered at a high volume level, which will allow a group of listeners in proximity to the mobile device 205 to hear that advertisement. This feature has the apparent advantage of increasing the audience for the advertisement. Before rendering the advertisement associated with message 206, advertising application 210 may also generate an inquiry concerning whether a headset is operating in connection with mobile device 205. Upon receiving a response to said inquiry, and depending upon the particular instructions in message 206, advertising application 210 may render the advertisement associated with message 206 only if a headset is present. This feature is preferable to make the system more attractive in connection with advertisements featuring adult entertainment, sensitive personal topics, and the like.

Whenever advertising application 210 determines that message 206 identifies an advertisement that is to be rendered in the SMS or MMS formats, advertising application 210 relays the advertisement to SMS/MMS application 213 upon the arrival of the scheduled time or location for rendering said advertisement, as indicated by the scheduler data in message 206.

Advertising application 210 may provide the user of mobile device 205 with means to opt-in and/or opt-out from rendering advertisements, which may allow the user to opt-in or opt-out for an indefinite or finite period of time. In one particular implementation, this opt-in/opt-out feature can be used as the basis to incentivize consumers to participate in the advertising scheme. For example, discounts or credits can be offered to mobile service subscribers that allow their mobile devices to be used in an advertising campaign.

Figure 3:
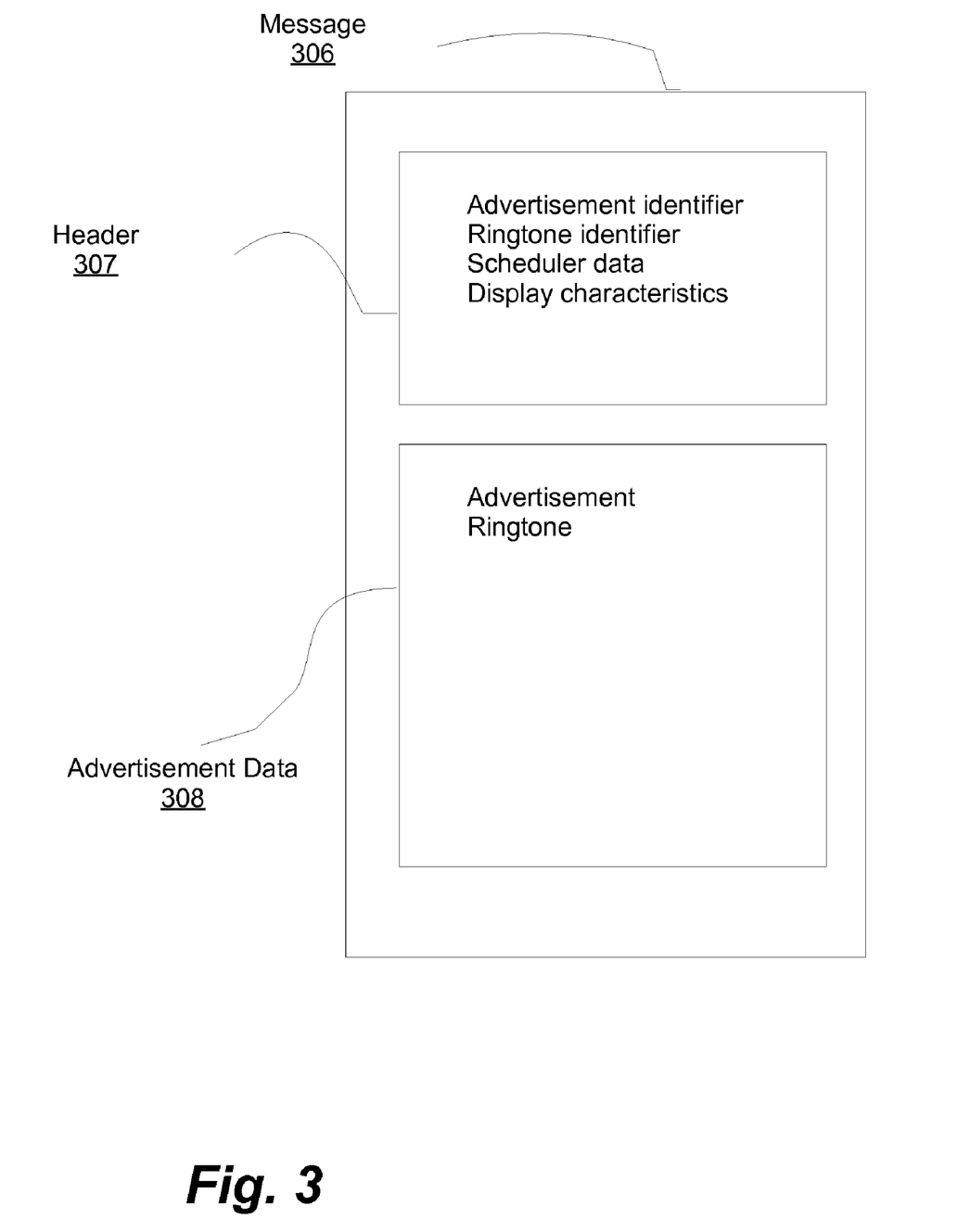
FIG. 3 illustrates, in slightly greater detail, by way of a block diagram one implementation of the message introduced in FIG. 1.

Referring now to FIG. 3, there is shown in a functional block diagram one implementation of the message 106 introduced in FIG. 1, illustrated in slightly greater detail. Message 306 includes a header 307. Header 307 includes an advertisement identifier to identify the advertisement associated with the message. Header 307 may also include a ringtone identifier to identify a particular ringtone which is to be rendered in connection with the identified advertisement. Header 307 may include scheduler data which specifies when or where the identified advertisement is to be rendered. It is also contemplated that header 307 may include display characteristics. The display characteristics may specify, for example, that the identified advertisement is to be rendered at a particular volume level, or that the identified advertisement is to be rendered only when a headset is present.

Message 307 may also include advertisement data 308. Advertisement data 308 may include an advertisement and/or a ringtone, for example, which include the actual data to be advertised. The advertisement data 308 could be digitized sound data, digitized visual data, or the like.

Figure 4:
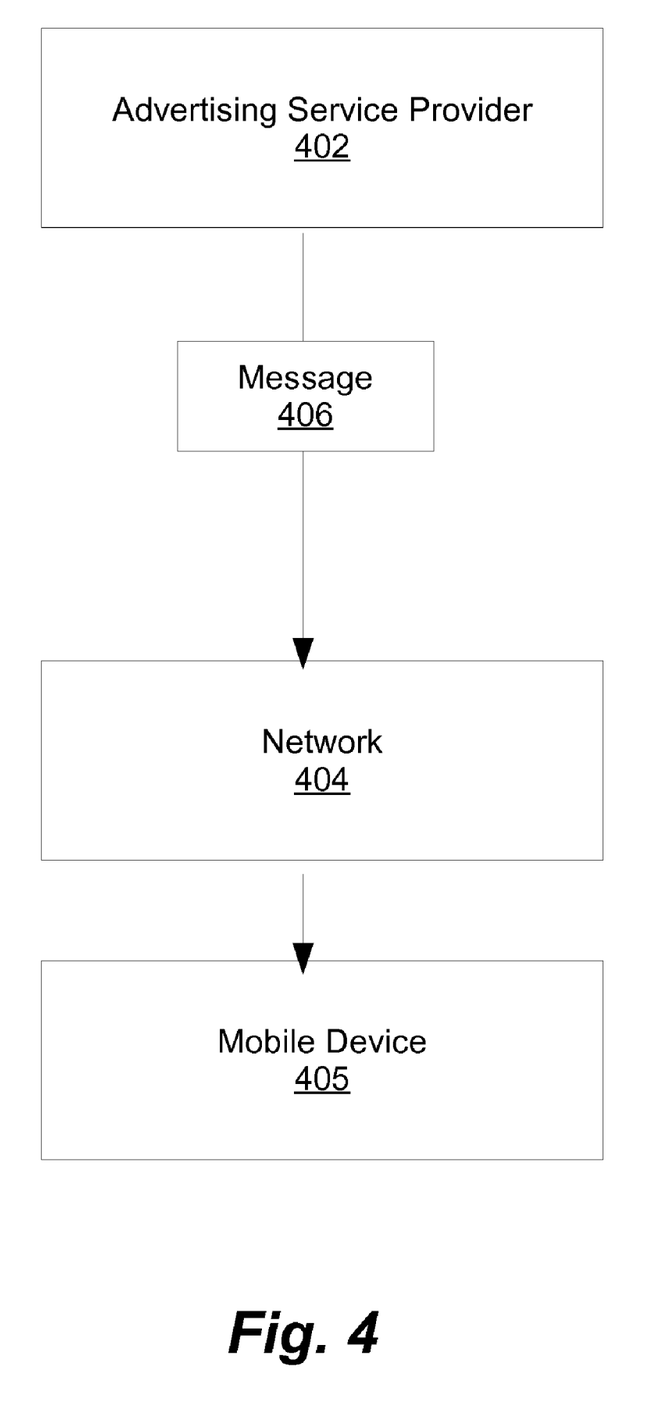
FIG. 4 illustrates by way of an operational flow diagram another embodiment of the present invention.

In FIG. 4, by way of a schematic flow diagram, there is depicted yet another embodiment of the present invention for an advertising method, product, and system. As shown, an advertising service provider 402 sends a message 406 to a network 404, for transmission to a mobile device 405. It is also contemplated that the advertising service provider 402 may send the message 406 directly to mobile device 405.

Figure 5A:
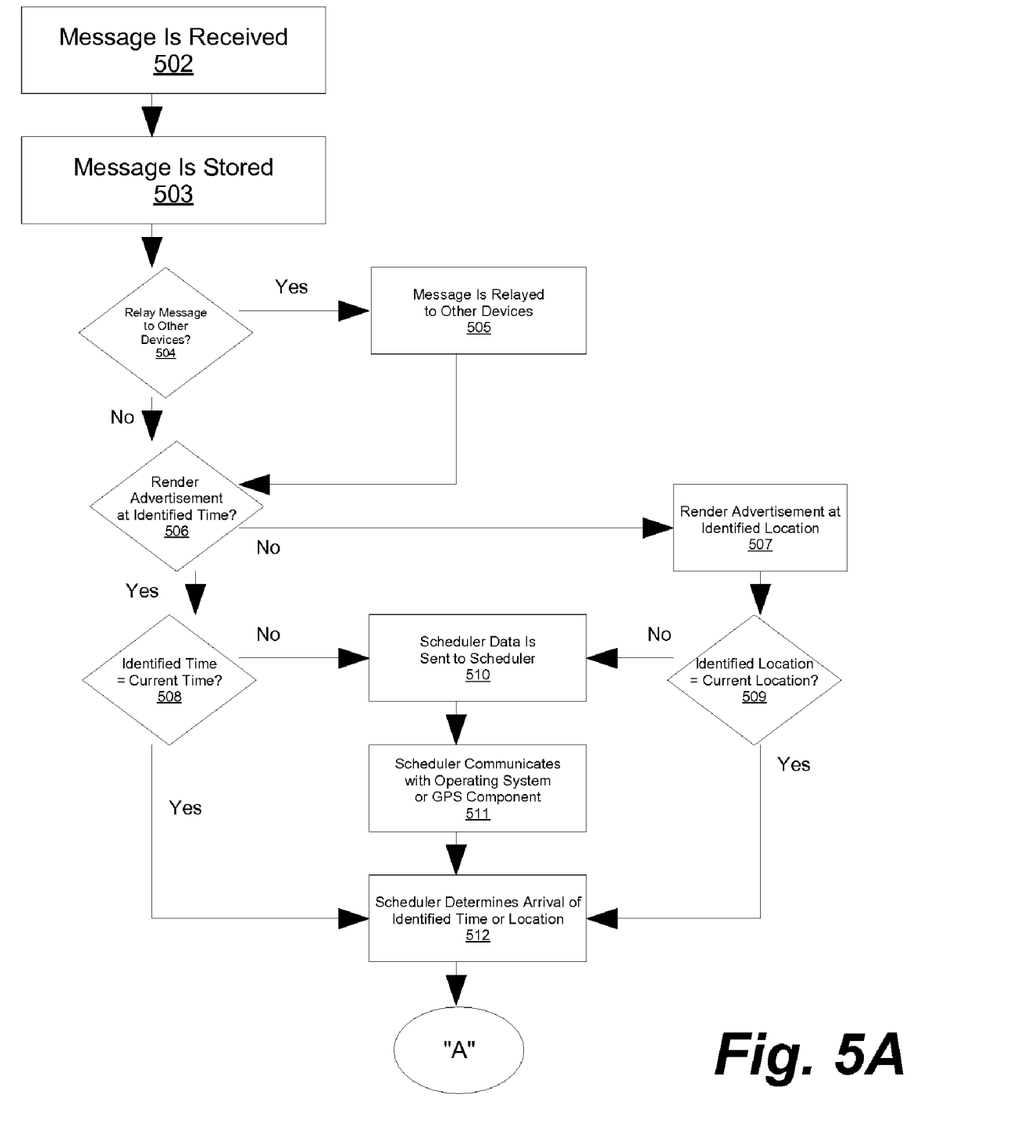
FIG. 5 illustrates by way of an operational flow diagram still another embodiment of the present invention.
Figure 5B:
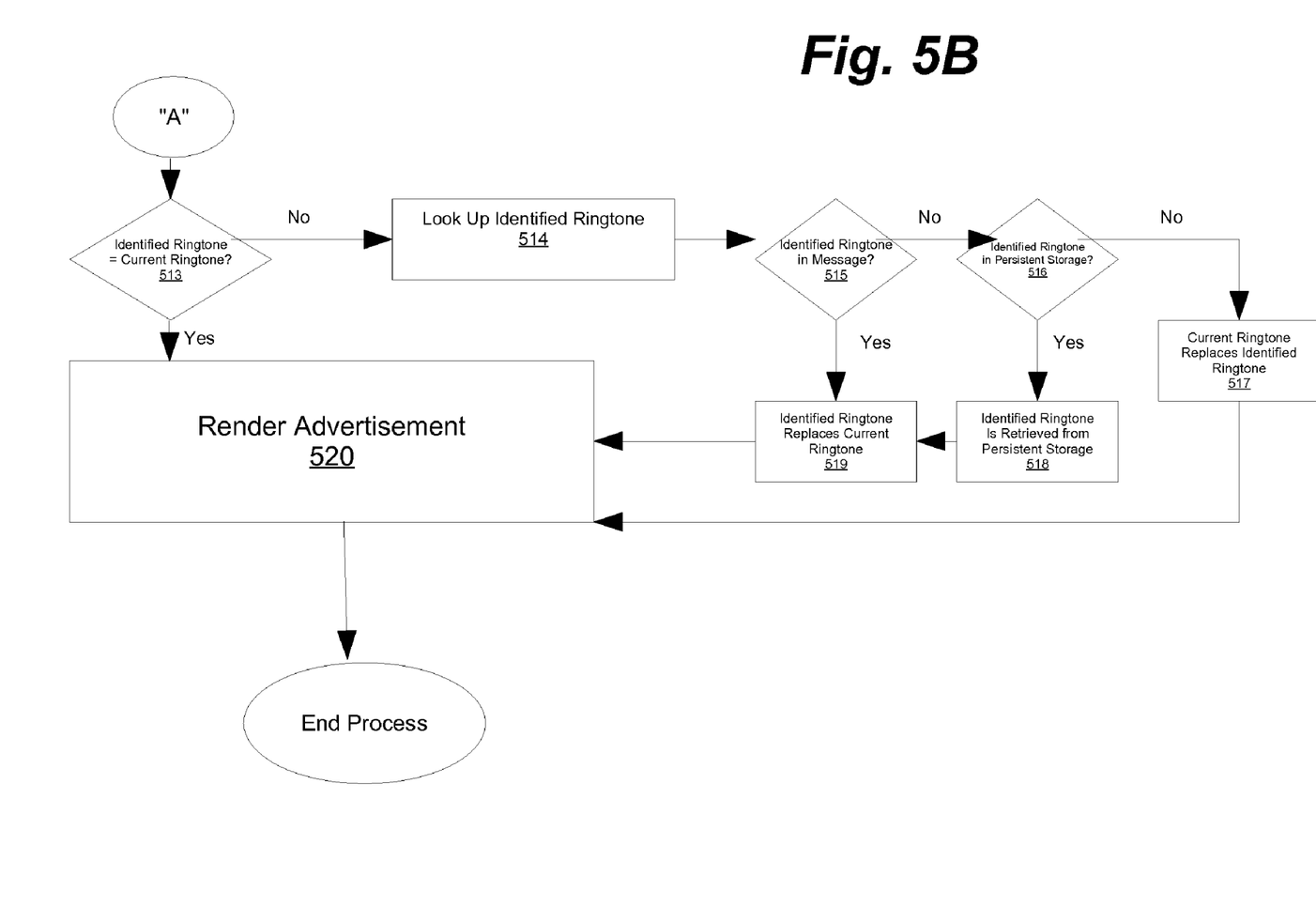

FIG. 5 depicts by way of a schematic flow diagram still another embodiment of the present invention. In step 502, a message is received by a mobile device. The message may include an advertisement or have an advertisement associated with it. The message is stored on a computer-readable medium in step 503. If data contained in the message header indicates that the message is to be relayed to other mobile devices (504), then the message is relayed to other devices (505).

In step 506, the message is reviewed to determine whether the advertisement associated with the message is to be rendered at a specific time or location. If the advertisement is scheduled for rendering at a specific time, it is first determined whether the specified time is the current time in step 508. If the advertisement is scheduled to be rendered at the current time, the scheduler signals the arrival of the identified time for rendering the advertisement (step 512). If the advertisement is scheduled for rendering at a later time, the scheduler data contained in the message is sent to the scheduler (step 510), and the scheduler communicates with the mobile device's operating system or any other means of determining the correct time (step 511).

When the scheduler determines the time identified for rendering the advertisement has arrived (step 512), the message is reviewed to determine whether the identified ringtone is the current ringtone (step 513). If so, the advertisement is rendered in connection with the current ringtone (step 520) and the process ends. If not, the message itself, as well as the ringtones stored in persistent memory, are scanned for the ringtone identified in the message (step 514). If the identified ringtone is contained in the message (step 515), that identified ringtone replaces the current ringtone (step 519), the advertisement is rendered in connection with the current ringtone (step 520), and the process ends. If the identified ringtone is contained in persistent storage (step 516), the identified ringtone is retrieved from persistent storage (step 518) and replaces the current ringtone (step 519), which is then rendered in connection with the identified advertisement (step 520), and the process ends. In the event the message identifies a ringtone which is neither contained in the message nor found in persistent storage, the current ringtone is used in place of the identified ringtone (step 517), the advertisement is rendered in connection with the current ringtone (step 520), and the process ends.

If the advertisement is to be rendered at an identified location, instead of an identified time (step 507), the scheduler communicates with the GPS component to determine whether the identified location is the current location (step 509). If the scheduler determines the mobile device has reached the location identified for rendering the advertisement (step 512), steps 513 through 520 are followed to ensure the ringtone identified in the message is rendered in connection with the identified advertisement, or that the current ringtone is used as a default ringtone in the event the message erroneously identifies a ringtone which is neither included with the message nor present in persistent storage. Alternatively, if the GPS component indicates at step 509 that the identified location has not yet been reached, the scheduler data contained in the message is sent to the scheduler (step 510), and the scheduler remains in communication with the mobile device's GPS component (step 511). When the scheduler determines the mobile device has reached the location identified for rendering the advertisement (step 512), steps 513 through 520 are followed as indicated above.

In another aspect, this embodiment of the invention may include steps in which, if the scheduler data provides that an advertisement is to be rendered in response to an incoming call, the scheduler communicates with the telephone application to determine when the mobile device receives an incoming call, and the advertisement is rendered when the scheduler determines the mobile device has received the incoming call. The scheduler data may provide that the advertisement is to be rendered in response to an incoming call from an identified telephone number. Accordingly, this embodiment of the invention may include steps in which the scheduler communicates with the telephone application to determine when the mobile device receives an incoming call from an identified telephone number, and the advertisement is rendered when the scheduler determines the mobile device has received the incoming call from the identified telephone number.

In yet another aspect, this embodiment of the invention may include steps in which persistent storage is scanned for the advertisement identified in the message, the identified advertisement is retrieved from persistent storage, and the advertisement is rendered in the manner provided in the message. Other optional steps would allow the user of the mobile device to opt-in or opt-out from rendering advertisements for a definite or indefinite period of time.

In still yet another aspect, this embodiment of the invention may include steps in which a message is scanned for display characteristics, and the advertisement identified in the message is rendered in the manner provided in the message. For example, the display characteristics may indicate the identified advertisement is to be rendered at a high volume level or only if a headset is present, in which event the advertisement will be rendered in the manner indicated by the display characteristics.

As will be further appreciated by those persons skilled in the art, the present inventive method, product and system, inclusive of one or more embodiments of its operation through software and hardware systems and the like, affords distinct business advantages not previously available to vendors and other businesses relating to marketing, sale and distribution of products, information and services. In this aspect, the present invention provides advantageous and novel methods of conducting an array of business functions, comprising, inter alia, rendering an advertisement by a mobile device to alert the user as to availability of desirable goods and/or services and the like; alerting a mobile device user to a triggering event at virtually any place and time, or any particular location, and inviting the user affirmatively act upon the event to join a particular gathering, such as a department store sale, or to acquire a special object of interest; conducting marketing research by causing advertisements for a particular good or service to be rendered by the mobile devices of a specifically defined target audience; rendering a public service announcement at high volume on one or more mobile devices, to provide the public in a certain area with information concerning matters of public interest; and causing advertisements for confidential or sensitive goods and services to be rendered only by mobile devices whose users are wearing headsets.

While this invention has been described in connection with what are currently considered to be the most practical and desirable embodiments, it is to be understood that the invention is not limited to the disclosed embodiments in any way as such are merely set forth for illustrative purposes. The present inventive product and system and methods of advertising are intended to cover an array of various modifications and equivalent arrangements, all of which are contemplated for inclusion within the scope and spirit of the disclosure and appended claims.

What is claimed is:

1. A method for advertising, comprising, in no particular order, the steps of:
   receiving a message at a mobile device, the message including an advertisement;
   storing the advertisement on the mobile device;
   generating an inquiry concerning whether a headset is present;
   receiving a response to the inquiry; and
   rendering the advertisement based on the occurrence of an advertisement event if the headset is present.

2. The method of claim 1, wherein the advertisement event comprises an incoming call.

3. The method of claim 1, wherein the advertisement event comprises entering a predefined geographic area.

4. The method of claim 1, further comprising:
   scheduling an identified time when the advertisement will be rendered; and rendering the advertisement at the identified time.

5. The method of claim 1, further comprising relaying the advertisement to other devices.

6. The method of claim 1, wherein the advertisement comprises an sound.

7. The method of claim 1, further comprising enabling the user of the mobile device to opt-in to receiving the advertisement.

8. A method for advertising, comprising, in no particular order, the steps of:
   receiving a message at a mobile device, the message including an advertisement;
   storing the advertisement on the mobile device;
   generating an inquiry concerning whether a headset is present;
   receiving a response to the inquiry; and
   rendering the advertisement at an identified volume level if the headset is present based on the occurrence of an advertisement event.

9. A computer-readable medium encoded with computer-executable instructions which, when executed, perform the method recited in claim 1.

10. A mobile device, comprising:
    means for receiving a message at a mobile device, the message having an associated advertisement;
    means for storing the advertisement;
    means for generating an inquiry concerning whether a headset is present;
    means for receiving a response to the inquiry; and
    means for rendering the advertisement based on the occurrence of an advertisement event if the headset is present.

11. The mobile device recited in claim 10, wherein the rendering means enables rendering the advertisement in response to an incoming call.

12. The mobile device recited in claim 10, wherein the rendering means enables rendering the advertisement in response to the mobile device entering a geographic area with which the advertisement is associated.

13. The mobile device recited in claim 10, further comprising:
    means for scheduling an identified time when the advertisement will be rendered; and
    means for rendering the advertisement at the identified time.

14. The mobile device recited in claim 10, further comprising means for relaying the advertisement to other devices.

15. The mobile device recited in claim 10, further comprising means for rendering an identified ringtone in connection with the advertisement.

16. The mobile device recited in claim 10, further comprising means for enabling the user of the mobile device to opt-in and/or opt-out from rendering advertisements.

17. A mobile device, comprising:
    means for receiving a message at a mobile device, the message having an associated advertisement;

means for storing the advertisement;

means for generating an inquiry concerning whether a headset is present;

means for receiving a response to the inquiry; and means for rendering the advertisement at an identified volume level if the headset is present based on the occurrence of an advertisement event.

* * * * *